Feb. 7, 1939.     M. B. BLEECKER     2,146,524
DYNAMIC DAMPER GUIDED FOR POLAR AND TRANSLATIONAL MOVEMENT
Filed Oct. 16, 1937
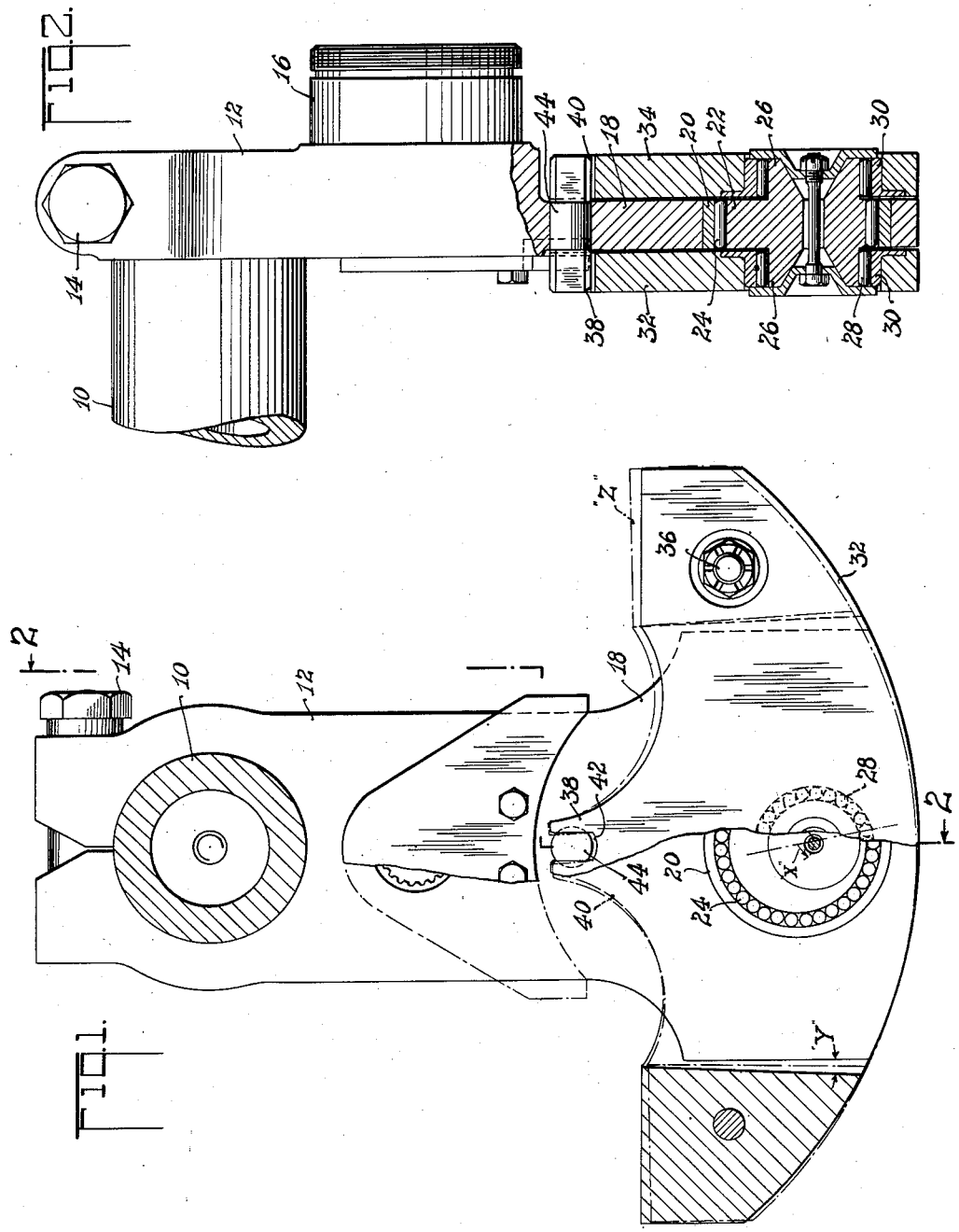
INVENTOR
*MAITLAND B. BLEECKER*
BY
ATTORNEY Patented Feb. 7, 1939

2,146,524

UNITED STATES PATENT OFFICE 2,146,524

DYNAMIC DAMPER GUIDED FOR POLAR AND TRANSLATIONAL MOVEMENT

Maitland B. Bleecker, Montclair, N. J., assignor to Wright Aeronautical Corporation, a corporation of New York Application October 16, 1937, Serial No. 169,358

5 Claims. (Cl. 74—604)

This invention relates to so-called dynamic or synchronous pendulum dampers for eliminating torsional vibrations as in engine crankshafts. It is known that if a pendulum mass is suspended from a rotating shaft, so as to be stabilized by centrifugal force, the frequency of pendulum swing goes up with the speed of rotation so that the pendulum makes a constant number of swings per crankshaft revolution. It is also known that if the frequency of such a pendulum is made synchronous to the frequency of the torque impulses to which the shaft is subjected, then the pendulum will automatically swing 180° out of phase with the impressing force which is, accordingly, counterbalanced to the suppression of torsional vibration.

In radial engines, the relatively large counterweight masses used have been converted to dynamic torsional damping by suspending the mass to swing without rotational component about the appropriate small radius which, in the case illustrated, is of the order of ⅜". This short pendulum length, necessary to give the required high frequency, cannot be obtained in a body of the size of the normal counterweight by a conventional simple single point pivotal suspension because of the large radius of gyration of these weights (over 3"). It is known that the highest frequency that can be obtained by simple single point suspension is that when the pendulum length equals the radius of gyration which is obviously much too great a pendulum length for the present purpose.

Accordingly, "bi-filar" suspension has been resorted to, and according to the teachings of the co-pending patent of Chilton No. 2,112,984, this comprises rollers loosely engaging pairs of spaced holes in the the crankshaft and weight whereby arcuate paths are defined by the difference of the diameter of the roller and the engaged holes and the weight swings without rotational or polar component. While this construction has gone into extended and successful use, certain disadvantages have been found to inhere in the "bi-filar" or two point suspension. One of these is that cases had been known where the counterweight has developed a torsional vibration about the radial axis of the crank-cheek which has caused longitudinal motions at the spaced rollers, resulting in scuffing of the rolling contact surfaces.

The present invention teaches a novel means whereby a single eccentric supporting means may be used at the center of the weight and the weight stabilized by a torque arm. While not entirely suppressing polar or rotational movement of the weight, this yet reduces the angular amplitude to a small value which is determinate. With any given radius of eccentric suspension, this polar movement slows down the frequency of pendulum swing so that the eccentric radius is, accordingly, reduced to bring the frequency back to the desired figure to synchronize with the disturbing impulses.

The objects and advantages of the invention will be obvious from the foregoing preamble and from the following description with reference to the drawing, in which:

Fig. 1 is an end view in part section through the counterweight, and

Fig. 2 is a side view of part section on the line 2—2 of Fig. 1.

In the drawings, 10 designates the crankpin of a conventional crankshaft to which there is secured a rear cheek 12 by the usual clamp bolt 14. The crankcheek 12 is provided with the usual rear journal 16 and has an extension or counterweight arm 18 in which is formed a bore to receive a roller race 20 in which is mounted an eccentric 22 by means of rollers or needles 24. The eccentric 22 has integral pins 26, the eccentricity of which defines the desired radius of pendulum swing indicated at X, Fig. 1, and the pins are provided with roller bearings 28 engaging suitable bushings 30 fitted in counterweight members 32—34 conveniently secured together by bolts 36 to embrace the extension 18 with a clearance indicated at Y which is made more than the normal amplitude of pendulum oscillation.

According to provisions of the present invention, torque arms 38—40 extend upwardly from the counterweight members 32—34 and are slotted as indicated at 42 to engage flattened ends of a crosspin 44 which is freely fitted in a bore in the crankshaft extension 18, as shown.

It will be seen that the counterweight is supported against centrifugal force exclusively by the eccentric pins 26, the centers of which follow the path X and that, due to the torque arms, this motion involves some slight angular oscillation of the weight about the center of the crosspin, as shown by the dotted profile lines Z which represent one extreme of normal pendulum swing.

In the design of the mechanism, the pin 22—26 and the pin 44 will ordinarily be located on a radius from the crankshaft axis, and particularly the spacing of the pin 44 from said axis will be such as to minimize the shear effect thereon due to rotational forces on the counterweight. It is now believed that the eccentric pin 22—26 will be located preferably at the center of gravity of the counterweight. Only the centrifugal forces are assumed by the pin 22—26, and the pin 44 will control only the polar movement of the counterweight about its center of gravity.

It will now be seen that the path of travel of points remote from the suspension point are slightly modified from the arc X, due to the small rotational component introduced by the method of stabilizing by means of torque arm, and this polar movement will slightly reduce the natural frequency of the weight as a pendulum as compared to the purely parallel mode of vibration obtained with the "bi-filar" suspension of the prior art. This reduction in frequency is, accordingly, compensated for by making the radius X of the eccentric less than would be appropriate for "bi-filar" suspension having strictly non-rotational vibration.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. The combination with a crankshaft extension and a counterweight, of suspension means therebetween comprising a single member having relatively eccentric journals in bearing engagement respectively with the extension and the counterweight and controlling means for the counterweight comprising a torque arm extending from the weight and means articulating said torque arm to said crankshaft extension.

2. The combination with a counterweight member and a crankshaft member, one embracing the other, of a suspension means between said members comprising a single member having relatively eccentric journals in bearing engagement respectively with the crankshaft member and the counterweight member, and means introducing a small rotational component into the swing of said weight relative to the crankshaft member comprising an arm extending from the weight and articulated to the crankshaft member.

3. The combination with a crankshaft member and a counterweight member, one embracing the other, of means having relatively eccentric journals in bearing engagement with respective members for suspending said counterweight from said crankshaft and defining an arcuate path of travel of the counterweight at the journal engagement, and means to limit angular swing of said weight about the journal engagement to a relatively small angle compared to the angular excursion of said counterweight, said means comprising an articulation between and engaging said members spaced from the eccentric journal means and restraining the counterweight at the articulation engagement against lateral movement.

4. In combination, a crankshaft member, means having relatively eccentric journals, one thereof being rotatably mounted in the member, a counterweight member mounted on the other journal, an extension on said counterweight, and means articulating said extension to said crankshaft, said articulating means being free for radial but not for circumferential movement with respect to the axis of crankshaft rotation.

5. In a pendulous counterweight system, a crankshaft extension member, a counterweight member, one embracing the other, a single pin engaging both members supporting the counterweight against centrifugal force, said pin being organized to guide said counterweight in an arcuate path of swinging movement relative to said extension and the pin itself permitting relative rotation therebetween, and stabilizing means, remote from said pin operatively connecting said member, for holding the adjacent portion of said counterweight member from swinging movement relative to said extension member.

MAITLAND B. BLEECKER.